United States Patent
Kuroda

(10) Patent No.: US 11,041,524 B2
(45) Date of Patent: Jun. 22, 2021

(54) BALL JOINT

(71) Applicant: NHK Spring Co., Ltd., Kanagawa (JP)

(72) Inventor: Shigeru Kuroda, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 574 days.

(21) Appl. No.: 15/765,154

(22) PCT Filed: Sep. 27, 2016

(86) PCT No.: PCT/JP2016/078474
§ 371 (c)(1),
(2) Date: Mar. 30, 2018

(87) PCT Pub. No.: WO2017/057371
PCT Pub. Date: Apr. 6, 2017

(65) Prior Publication Data
US 2018/0298940 A1 Oct. 18, 2018

(30) Foreign Application Priority Data
Oct. 2, 2015 (JP) .............................. JP2015-196696

(51) Int. Cl.
*F16C 11/08* (2006.01)
(52) U.S. Cl.
CPC ....... *F16C 11/08* (2013.01); *Y10T 403/32721* (2015.01)
(58) Field of Classification Search
CPC ................ B60G 7/005; B60G 21/0551; B60G 2202/135; B60G 2204/1224; F16C 11/06; F16C 11/0628; F16C 11/0633; F16C 11/0638; F16C 11/068; F16C 11/08;
(Continued)

(56) References Cited

U.S. PATENT DOCUMENTS 3,154,333 A * 10/1964 Townsend ........... F16C 11/0628
403/122
3,787,127 A * 1/1974 Cutler ................. F16C 11/0638
403/133
(Continued)

FOREIGN PATENT DOCUMENTS

CN 101542141 A 9/2009
DE 10110738 C1 11/2002
(Continued)

OTHER PUBLICATIONS

Specification Translation of JP 2000-179537. Shishiku, et al. Ball Joint. Jun. 27, 2000.*
(Continued)

*Primary Examiner* — Josh Skroupa
(74) *Attorney, Agent, or Firm* — Marshall, Gerstein & Borun LLP

(57) ABSTRACT

A ball joint has a ball stud, a housing and a ball seat. The seat is an elastic body in a tubular shape with the top and the bottom being open, and has a spherical space to accommodate a ball portion. The housing has a spherical inner face that is close to an outer periphery of the ball portion, to accommodate the ball portion in the inner face via the seat so as to support the ball stud. A clamped portion arranged at a peripheral end of the housing is clamped to press the seat so that the ball stud can be swung and rotated.

12 Claims, 12 Drawing Sheets

(58) Field of Classification Search
CPC ..... Y10T 403/32721; Y10T 403/32729; Y10T 403/32737
USPC .......................................... 403/133, 134, 135
See application file for complete search history.

(56) References Cited

U.S. PATENT DOCUMENTS

| | | | | |
|---|---|---|---|---|
| 3,945,739 | A * | 3/1976 | Abe | F16C 11/0633 403/138 |
| 4,231,673 | A | 11/1980 | Satoh et al. | |
| 4,904,106 | A * | 2/1990 | Love | F16C 11/0638 403/135 |
| 5,395,176 | A | 3/1995 | Zivkovic | |
| 5,427,467 | A | 6/1995 | Sugiura | |
| 5,601,378 | A | 2/1997 | Fukukawa et al. | |
| 8,281,490 | B2 * | 10/2012 | Nishide | F16C 11/0633 29/898.049 |
| 8,616,800 | B2 * | 12/2013 | Abe | F16C 11/068 403/139 |
| 8,657,520 | B2 | 2/2014 | Kuroda et al. | |
| 9,719,554 | B2 * | 8/2017 | Nishide | F16C 11/0633 |
| 2003/0072609 | A1 | 4/2003 | Bohne et al. | |
| 2009/0279820 | A1 | 11/2009 | Nishide et al. | |
| 2010/0054851 | A1 * | 3/2010 | Bohne | F16C 11/0628 403/122 |
| 2011/0103883 | A1 | 5/2011 | Seol et al. | |
| 2015/0003896 | A1 | 1/2015 | Nishide et al. | |
| 2016/0131182 | A1 | 5/2016 | Matsuura | |

FOREIGN PATENT DOCUMENTS

| | | | | |
|---|---|---|---|---|
| DE | 102006031914 A1 * | 1/2007 | .......... | F16C 11/0638 |
| EP | 0442602 A1 | 8/1991 | | |
| EP | 1865212 A1 | 12/2007 | | |
| JP | S46033042 Y1 | 11/1971 | | |
| JP | 6449719 | 3/1989 | | |
| JP | 3011119 U | 5/1995 | | |
| JP | H08159147 A | 6/1996 | | |
| JP | 2000179537 A | 6/2000 | | |
| JP | 3168229 B2 | 5/2001 | | |
| JP | 3369659 B2 | 1/2003 | | |
| JP | 2005061537 A | 3/2005 | | |
| JP | 2006300264 A * | 11/2006 | ............ | F16C 11/068 |
| JP | 2009299710 A * | 12/2009 | ............ | F16C 11/068 |
| JP | 2011137489 A | 7/2011 | | |
| JP | 5165011 B2 | 3/2013 | | |
| JP | 2013185695 A | 9/2013 | | |
| JP | 2015031384 A | 2/2015 | | |
| WO | WO-2006018004 A1 | 2/2006 | | |

OTHER PUBLICATIONS

Decision of Refusal from Japan Patent Office (dated Oct. 4, 2017) for JP2015-196696.
Reasons for Refusal from Japan Patent Office (dated Aug. 26, 2016) for JP2015-196696.
Reasons for Refusal from Japan Patent Office (dated Mar. 16, 2017) for JP2015-196696.
The Third Chinese Office Action with English Translation for Chinese Application No. 201680054932.1, dated Oct. 26, 2020.
Chinese First Office Action with Translation for Application No. 201680054932.1, dated Sep. 30, 2019.
Second Office Action for Chinese Patent Application No. 201680054932.1, dated Jun. 16, 2020, with an English Translation.
European Search Report for Application No. 16851542.7, dated May 6, 2019.

* cited by examiner

BALL JOINT

CROSS-REFERENCE TO RELATED APPLICATION

The present application is the US national phase of International Application No. PCT/JP2016/078474, filed Sep. 27, 2016, which claims priority to Japanese Application No. 2015-196696, filed Oct. 2, 2015. The priority application, JP 2015-196696, is hereby incorporated by reference.

BACKGROUND OF THE INVENTION

Field of the Invention

The present invention relates to a ball joint for use in a stabilizer link that is coupled between a suspension device and a stabilizer device of a vehicle, or the like.

Description of Related Arts

Suspension devices of a vehicle is intended to reduce impact transmitted to a vehicle body from a road surface, and a stabilizer device is intended to increase roll stiffness (rigidity against twisting) of the vehicle body. That is, the stabilizer device serves to couple a stabilizer bar to the suspension devices of the vehicle so as to stabilize a posture of the vehicle by utilizing torsion spring force of the stabilizer bar. For example, the stabilizer device is configured such that both ends of the stabilizer bar formed in a U-shape are coupled to actuating portions of the suspension devices and a torsion portion of the stabilizer bar is fixed with a fixing member to allow a body frame to be deformed, so as to receive torsion reaction force.

The suspension devices are coupled to the stabilizer device via ball joints arranged at both ends of stabilizer links. As for conventional ball joints, Patent Document 1 describes a ball joint device, for example. The ball joints are, as described in Patent Documents 2 and 3, configured to be fixed at both ends of a support bar in a rod shape.

In the ball joint, a spherical ball of a ball stud is rotatably accommodated in a cup-shaped housing via a ball seat made of thermoplastic synthetic resin. A stud portion unidirectionally extends from the ball portion, and a dust cover formed with an elastic member is attached between the stud portion and the housing. One end of the support bar is fixed on the outer periphery of the housing.

In the ball joint as constructed above, the ball portion swings and slides on the ball seat as the suspension devices of the vehicle stroke. A property at the time of the swinging and sliding is defined as a swing-and-slide torque or a rotation torque.

The inner diameter of the inner periphery of the housing is made smaller than the outer diameter of the outer periphery of the ball seat, to sufficiently fix the ball seat in the housing by elastic force. If a tightening margin as a difference between the inner diameter and the outer diameter is large, the ball seat is pressed inward by the housing. This increases frictional force between the ball seat and the ball, which increases the swing-and slide torque to deteriorate riding comfort. Then, the tightening margin is reduced to lower the frictional force for decreasing the swing-and-slide torque, to improve riding comfort.

PRIOR ART

Patent Document 1: Japanese Patent No. 5165011
Patent Document 2: Japanese Patent No. 3168229
Patent Document 3: Japanese Patent No. 3369659

SUMMARY OF THE INVENTION

Problem to be Solved by the Invention

As described above, the swing-and-slide torque is decreased by reducing the tightening margin between the housing and the ball seat. However, at the same time, elastic lift reacting to the swing-and-slide torque increases. The elastic lift is a movement amount when a load is applied to. That is, if the tightening margin is reduced, the elastic lift amount increases, so that the ball seat is deformed and clattering is generated. The clattering may lead to abnormal noise while the vehicle is traveling.

The outer diameter (for example, $\phi$ 18 to 25) of the ball seat has a variation of about 0.05 to 0.10 mm due to a variation in sheet molding shrinkage. The housing is molded by press molding or cold forging forming, and the inner diameter thereof has the same variation of about 0.05 to 0.10 mm due to molding accuracy. For example, in a case where the dimensional tolerance of the inner diameter ($\phi$ 20) of the housing is 0.07 mm and the dimensional tolerance of the outer diameter ($\phi$ 20) of the ball seat is 0.07 mm, the dimensional tolerance becomes large as [0.07+0.07=0.14 mm], but this variation in dimension cannot be reduced.

Since such a ball seat is assembled to fit into the housing, dimensional variations of the parts are accumulated to increase the variation of the ball joint. This causes a problem in which the property cannot be controlled for the swing-and slide. Therefore, when a lower torque is attempted for the purpose of improving riding comfort of the vehicle, the swing-and-slide torque cannot be reduced to a level to achieve given riding comfort.

The present invention is made to solve such a problem and provides a ball joint that reduces a swing-and-slide torque and restrains an increase of an elastic lift amount to suppress occurrence of clattering, so as to improve riding comfort of a vehicle.

Solution to Problems

In order to solve the above-identified problem, the present invention provides a ball joint having: a ball stud that has a stud portion with one end being coupled to a structure body and the other end being joined in one piece with a spherical body portion; a housing that includes a space in which the spherical body portion of the ball stud is supported swingably and rotatably; and a support member that is arranged between the housing and the spherical body portion, wherein the support member is an elastic body having a given thickness, and has an opening for the stud portion to protrude therethrough and a spherical space inside to accommodate the spherical body portion therein, and wherein the housing has a spherical inner face along an outer periphery of the spherical body portion, and the support member is arranged to fill in a gap between the outer periphery of the spherical body portion that is inserted toward the spherical inner face and the spherical inner face.

Advantageous Effects of the Invention

According to the present invention, a ball joint is provided that reduces a swing-and-slide torque and restrains an increase of an elastic lift amount to suppress occurrence of clattering, so as to improve riding comfort of a vehicle.

DETAILED DESCRIPTION OF THE PREFERRED EMBODIMENTS

Hereinafter, embodiments of the present invention will be described with reference to the drawings.

Embodiment

Figure 1:
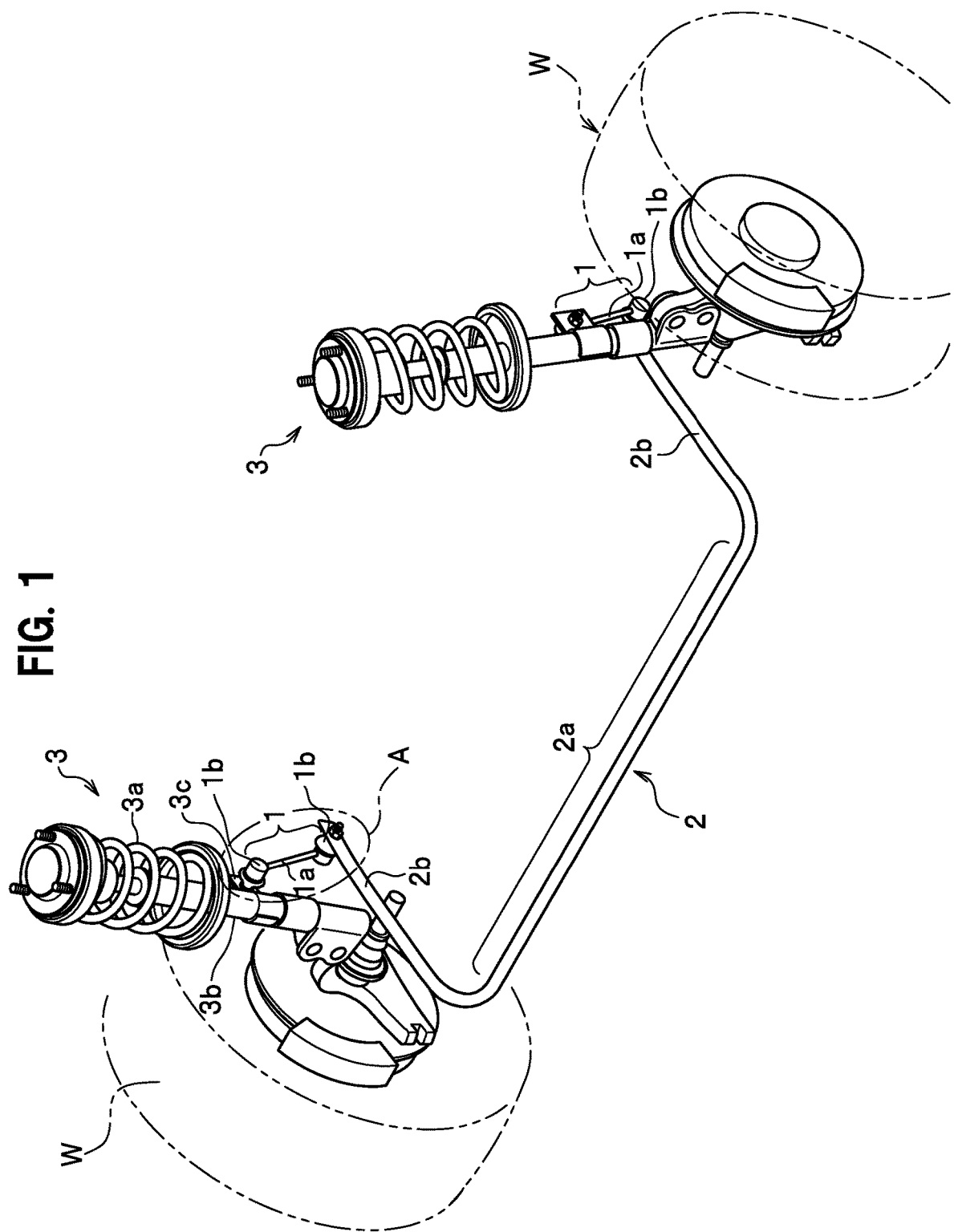
FIG. 1 is a perspective view of stabilizer links according to an embodiment of the present invention coupling dampers to a stabilizer.
Figure 2:
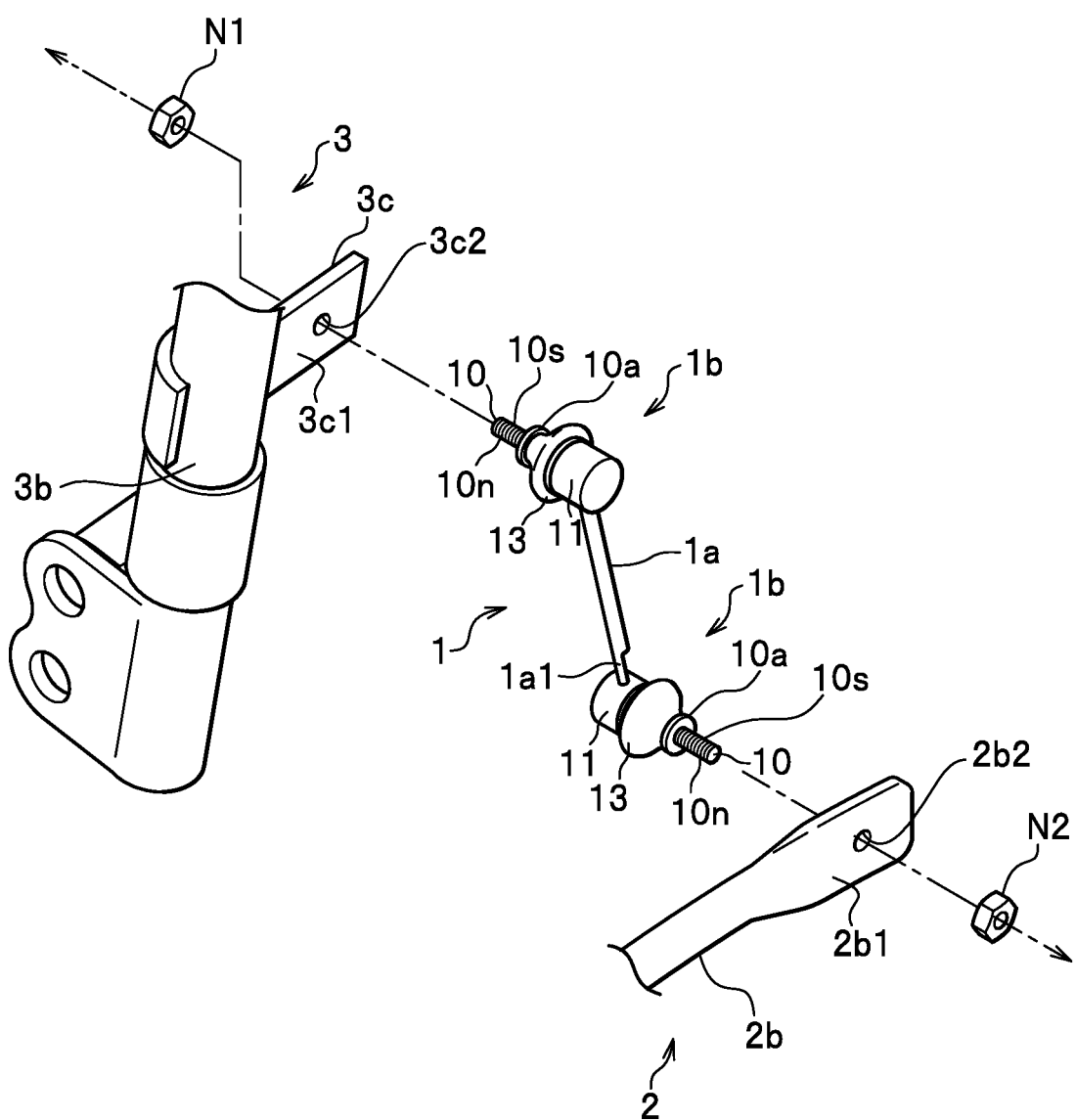
FIG. 2 is an exploded perspective view of those within a circle A in FIG. 1.
Figure 3A:
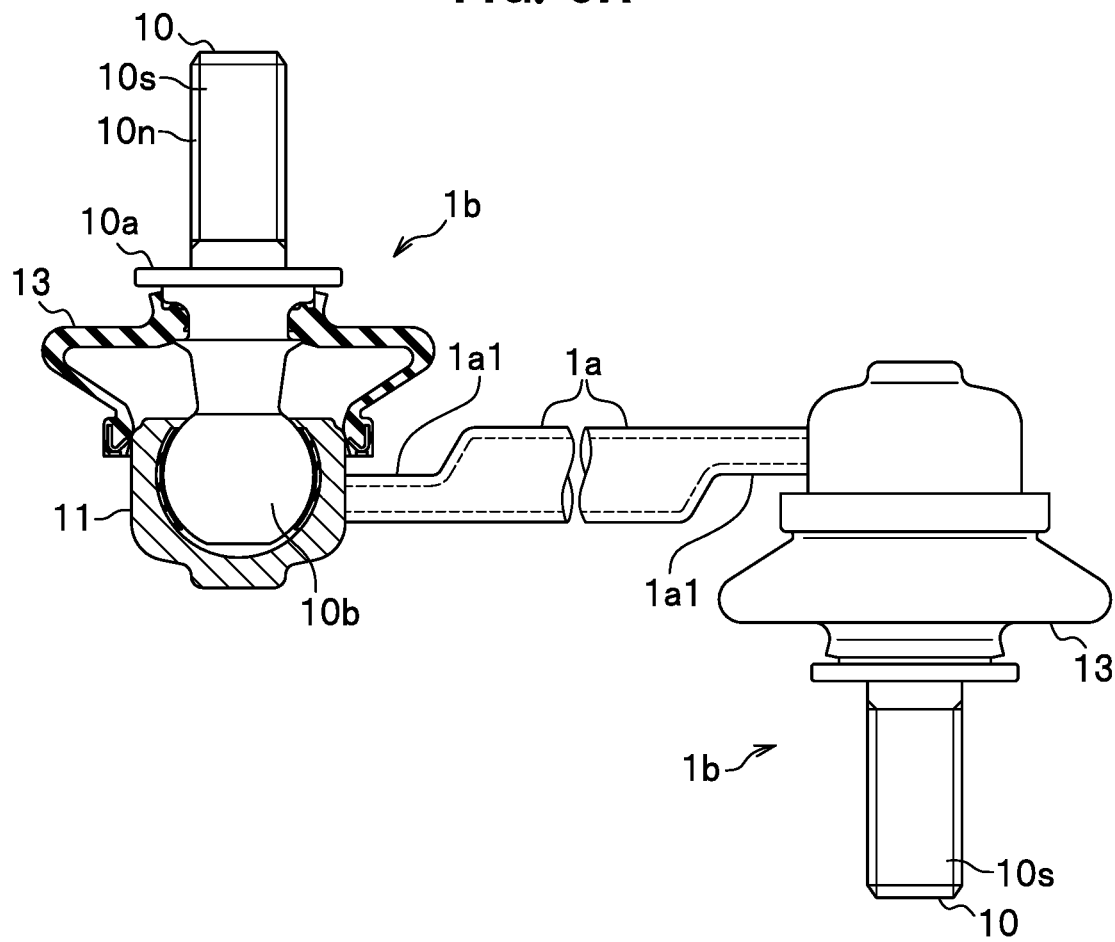
FIG. 3A is a side view of the whole stabilizer link.
Figure 3B:
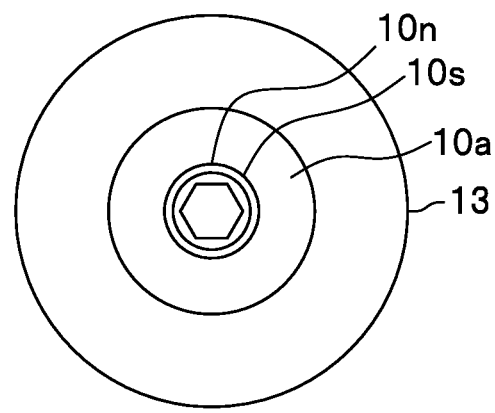
FIG. 3B is a top view of a ball joint in FIG. 3A.
Figure 3C:
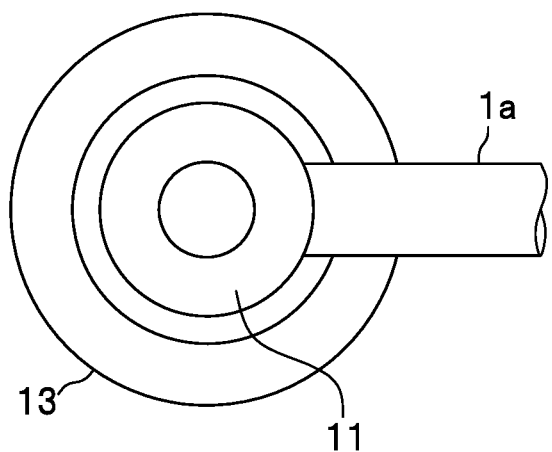
FIG. 3C is a bottom view of the ball joint in FIG. 3A.
Figure 3D:
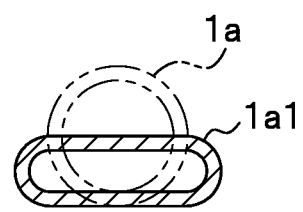
FIG. 3D is an end view showing a shape of one end face of a support bar in FIG. 3A.
Figure 4A:
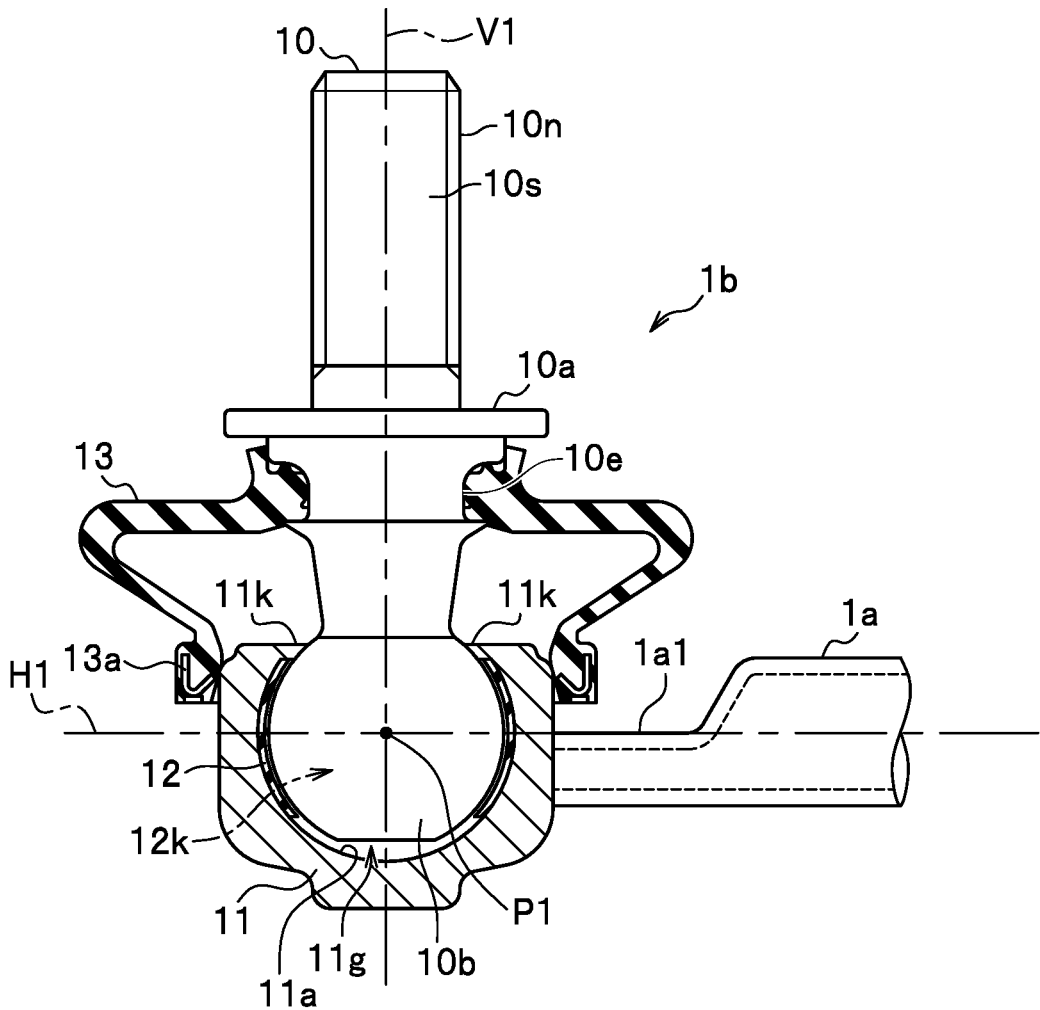
FIG. 4A is a longitudinal cross-sectional view of the ball joint.
Figure 4B:
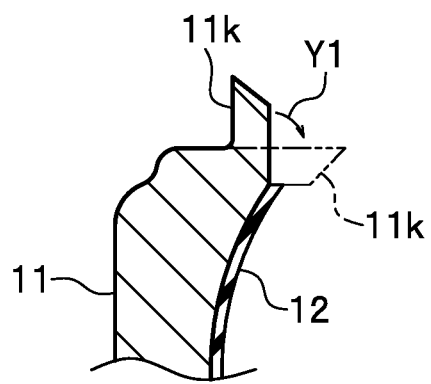
FIG. 4B is a schematic cross-sectional view of a clamped portion of a housing being clamped.

FIG. 1 is a perspective view of stabilizer links having ball joints of an embodiment according to the present invention coupling dampers to a stabilizer. FIG. 2 is an exploded perspective view of those within a circle A defined by a dash-dot line in FIG. 1. FIG. 3A is a side view of the whole stabilizer link having the ball joints, FIG. 3B is a top view of one of the ball joints in FIG. 3A, FIG. 3C is a bottom view of the ball joint, and FIG. 3D is an end view showing a shape of one end face of a support bar. FIG. 4A is a longitudinal cross-sectional view of the ball joint of the present embodiment, and FIG. 4B is a schematic cross-sectional view of a clamped portion of the housing being clamped.

A ball joint 1b of the present embodiment has features as follows. As shown in FIG. 4A, a ball seat 12 is an elastic body having a given thickness in a tubular shape with the top and bottom being open, and has a spherical space 12k in which a ball portion 10b is accommodated. Further, a housing 11 has a spherical inner face 11a along the outer periphery of the ball portion 10b, and the ball seat 12 is arranged to fill in a gap between the outer periphery of the ball seat 12 inserted toward the spherical inner face 11a and the spherical inner face 11a. Further, a clamped portion 11k at one peripheral end of the housing 11 is clamped to press the ball seat 12 from above downward such that the ball portion 10b accommodated in the spherical inner face 11a is swingable and rotatable.

Thus, the ball portion 10b is supported by the ball seat 12 having a thickness with small dimensional tolerance, instead of accumulation of diameter dimensions with large dimensional tolerance of respective components such as the housing and the ball seat, as with conventional technique above.

Note that the ball seat 12 may be in a spherical bag shape having only one opening (see an upper opening 12op in FIG. 5B) through which a stud portion 10s protrudes, other than the tubular shape with the top and bottom being open.

Next, a stabilizer link 1, a stabilizer device 2 and a suspension device 3 in FIG. 1 will be described. Wheels W for a vehicle (not shown) are attached to a vehicle body (not shown) via the suspension devices 3. Each suspension device 3 has a coil spring 3a and a damper 3b. The damper 3b rotatably supports the wheel W. The damper 3b and the coil spring 3a buffer an impact transmitted to the vehicle body from the wheel W.

The damper 3b is attached to the vehicle body (not shown) via the coil spring 3a. Vibration transmitted to the vehicle body by the viscous damping force during expansion and contraction of the damper 3b and the elastic force of the coil spring 3a is attenuated by the suspension device 3.

The stabilizer device 2 of a metallic bar in a U-shape is arranged between the right and left suspension devices 3. The stabilizer device 2 increases the roll stiffness (rigidity against twisting) of the vehicle body to suppress rolling of the vehicle. The stabilizer device 2 has a torsion portion 2a extending across the wheels W, and a pair of arm portions 2b extending in a direction perpendicular to the torsion portion 2a from both ends of the torsion portion portion 2a.

The stabilizer device 2 is a spring member in a rod shape suitably bent according to the shape of the vehicle. The stabilizer device 2 is coupled to the damper 3b supporting the wheel W via the stabilizer link 1, which is a feature of the present embodiment. This coupling is the same at both wheels W facing with each other. Note that the stabilizer device 2 or the suspension device 3 constitutes a structure body in the appended claims.

The stabilizer device 2 in FIG. 1 extends across the wheels W, and is twisted by the shift of the arm portions 2b via the stabilizer links 1 according to the difference in the expansion and contraction amount between the dampers 3b at both ends, such as when the vehicle turns. At this moment, the torsion portion 2a suppresses the rolling of the vehicle with the torsional elastic force to restore the twist.

Next, the stabilizer link 1 is described with reference to FIG. 2. The stabilizer link 1 has a support bar 1a in a rod shape and ball joints 1b. The ball joints 1b are arranged at both ends of the support bar 1a. The support bar 1a is, for example, a rod-shaped member made of a hollow steel bar. Further, in order to press-fit an iron link 13a of a dust cover 13 in an upper portion of the housing 11, as shown in FIG. 3D, the support bar 1a is pressed to be thin in the direction of a vertical axis V1 at its tip end 1a1.

As shown in FIG. 3A to FIG. 3C, the ball joint 1b has the ball stud 10 accommodated in the housing 11 and is supported to be swingably and rotatably. The stud portion 10s of the ball stud 10 has a flange 10a extending in a rounded shape, and a male screw 10n is threaded around the stud portion 10s which is closer to the distal end than the flange 10a. The dust cover 13 is attached between the flange 10a and the upper end of the housing 11 so as to be widened peripherally.

The ball stud 10 protruding from one of the ball joints 1b of the support bar 1a in FIG. 2 is fastened to a bracket 3c of the damper 3b. Further, the ball stud 10 protruding from the other ball joint 1b is fastened to the arm portion 2b of the stabilizer device 2.

The bracket 3c is attached to the damper 3b by spot welding or the like. The bracket 3c has a flat portion 3c1 extending in the orthogonal direction from the damper 3b. An attachment hole 3c2 is formed in the flat portion 3c1. By contrast, a distal end portion 2b1 of the arm portion 2b is plastically deformed flatly, and an attachment hole 2b2 is formed. The distal end portion 2b1 of the arm portion 2b is coupled to the flat portion 3c1 of the bracket 3c via the ball joints 1b at both ends of the stabilizer link 1.

This coupling will be described. The stud portion 10s of one ball joint 1b is inserted through the attachment hole 3c2 of the bracket 3c to the position of the flange 10a. The male screw 10n on the inserted stud portion 10s is tightly screwed with a nut N1, to fix the ball stud 10 to the damper 3b. The stud portion 10s of the other ball joint 1b is inserted through the attachment hole 2b2 of the arm portion 2b to the position of the flange 10a. The male screw 10n on the inserted stud portion 10s is tightly screwed with a nut N2, to fix the ball stud 10 to the arm portion 2b of the stabilizer device 2.

In this way, the ball joints 1b of stabilizer link 1 at both ends are fixed to the damper 3b and the arm portion 2b of the stabilizer device 2 via the ball studs 10. Since the ball studs 10 are swingably and rotatably supported (to be described in detail later), the ball joints 1b at both ends are movable relative to the damper 3b and the torsion portion 2a (FIG. 1). In other words, the stabilizer link 1 having the ball joints 1b at both ends acts in accordance with the motion of the suspension device 3 and the stabilizer device 2.

Next, a detailed configuration of the ball joint 1b will be described with reference to FIGS. 4A and 4B. As shown in FIG. 4A, the ball joint 1b has the ball stud 10, the housing 11, the ball seat 12 and the dust cover 13 to be configured as follows. That is, the ball stud 10 is accommodated in the housing 11a swingably and rotatably via the ball portion 10b and the ball seat 12. Note that the ball portion 10b constitutes a spherical body portion and the ball seat 12 constitutes a support member in the appended claims.

The dust cover 13 is widened peripherally to be attached between the flange 10a of the stud portion 10s of the ball stud 10 and the upper end of the housing 11. Note that in FIG. 4A, the ball stud 10 is oriented in the vertical direction, and the axis V1 in the vertical direction passing through a center P1 of the ball portion 10b and a horizontal axis H1 (reference line H1) passing through the center P1 and being perpendicular to the axis V1 are shown by chain lines. The axis V1 is also referred to as the vertical axis V1 because it extends perpendicular to the horizontal reference line H1.

<Ball Stud 10>

The ball stud 10 has the spherical ball portion 10b in a true sphere or almost true sphere shape and the stud portion 10s extending from the ball portion 10b unidirectionally (vertical direction to the horizontal reference line H1). The top of the ball portion 10b is connected to the ball stud 10s, and the bottom of the ball portion 10b is formed in a flat shape for securing the volume of a grease chamber 11g in the housing 11. The ball portion 10b may be made in a true sphere shape in an acceptable range.

Note that the direction to which the stud portion 10s in the ball joint 1b extends is appropriately determined according to a positional relationship between the damper 3b (see FIG. 2) and the arm portion 2b of the stabilizer device 2.

<Ball Seat 12>

The ball seat 12 is in a tubular shape with the top and bottom being open and is formed by injection molding with a thermoplastic resin having abrasion resistance and flexibility. As the thermoplastic resin, an engineering plastic or a super engineering plastic is used as an elastic body such as PA66 (Polyamide 66), PA6 (Polyamide 6), PPS (Polyphenylene sulfide), and POM (Polyacetal). Further, the thickness between the inner face and the outer face of the ball seat 12 is constant or substantially constant.

Figure 5A:
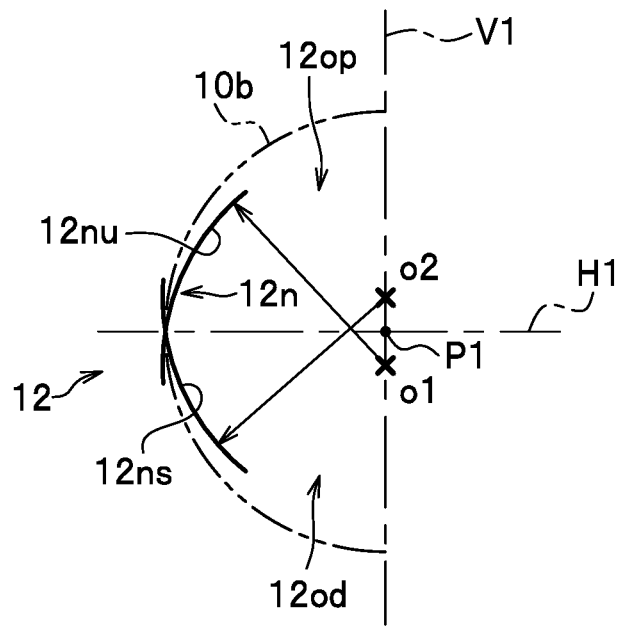
FIG. 5A is a conceptual diagram of center-offset of an inner face of a ball seat.
Figure 5B:
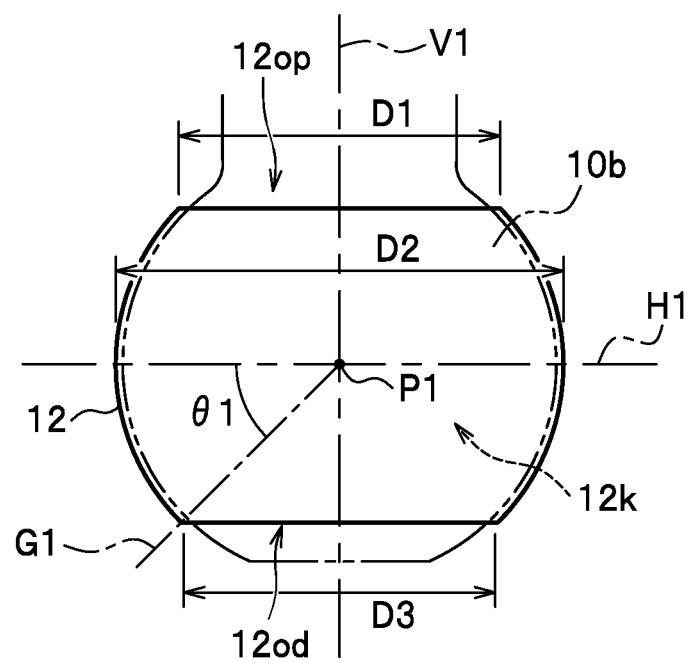
FIG. 5B is a diagram showing an opening end of a lower opening in the ball seat.

FIG. 5A is a conceptual diagram showing center offsets o1, o2 of the inner face of the ball seat 12, and FIG. 5B is a side view of the ball seat 12 having the ball portion 10b therein.

The ball seat 12 is arranged to have the maximum surface pressure distribution at its upper and lower end portions with respect to the ball portion 10b by the center offsets o1, o2 in FIG. 5A.

An inner face 12n of the ball seat 12 has an upper inner periphery 12nu closer to an upper opening 12op, which is formed above the reference line H1 when the ball portion 10b is accommodated so as to draw a circular arc around the center offset o1, and a lower inner periphery 12ns closer to a lower opening 12od, which is formed below the reference line H1 so as to draw a circular arc around the center offset O2. Note that the upper opening 12op constitute a first opening and the lower opening 12od constitutes a second opening in the appended claims.

Thus, the inner face 12n of the ball seat 12, as compared with the outer periphery of the ball portion 10b, has a smaller diameter in the upper inner periphery 12nu with the increasing distance upward from the reference line H1. Further, the inner diameter becomes smaller in the lower inner periphery 12ns with the increasing distance downward from the reference line H1. With such a smaller inner diameter, as shown in FIG. 5B, the surface pressure abutting with the ball portion 10b is increased when the ball portion 10b is accommodated in the ball seat 12. Therefore, the upper and lower ends abutting with the ball portion 10b of the ball seat 12 has the maximum surface pressure distribution with respect to the ball portion 10b.

Further, as shown in FIG. 5B, an opening diameter D1 at the upper opening 12op of the ball seat 12 has a dimension of [90%±5%] of a spherical diameter D2 passing through the center P1 of the ball portion 10b. The dimension of the opening diameter D1 is set to secure a swing angle of the stud 10s. An opening diameter D3 of the lower opening 12od is set to support a fall-off load (to be described later) such that the ball portion 10b does not fall off downward from the ball seat 12. The fall-off load is a load when the ball portion 10b, once inserted in the ball seat 12, falls off therefrom, prior to being inserted in the housing 11.

Further, the peripheral end of the upper opening 12op of the ball seat 12 is basically flat. The peripheral end of the lower opening 12od is also flat. Note that, each peripheral end of the upper opening 12op and lower opening 12od may be in any shape other than being flat.

The opening end of the lower opening 12od of the ball seat 12 is determined to position as follows. That is, a position (lower opening end position) of the opening end of the lower opening 12od is set to a position on the ball seat 12 where the ball seat 12 intersects with a straight line G1 that forms an angle $\theta 1$ with the reference line H1 at the center P1 of the ball portion 10b. The angle $\theta 1$ is set in the range satisfying $[41° \leq \theta 1 \leq 49°]$.

Figure 6:
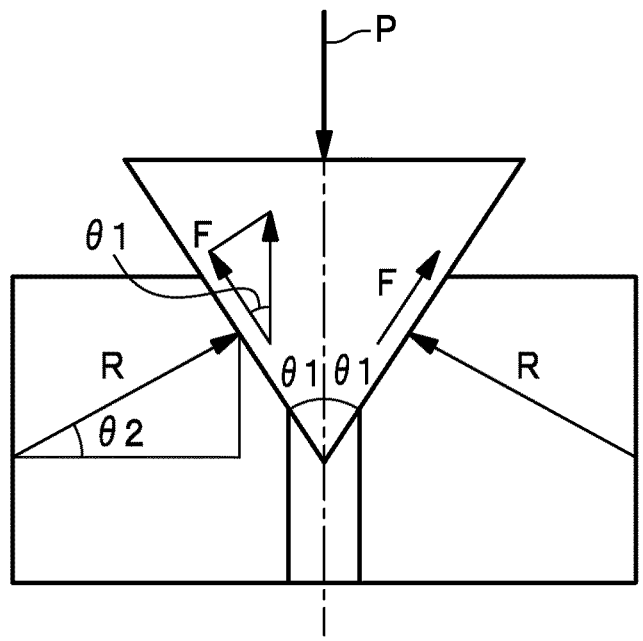
FIG. 6 is a conceptual diagram showing a vertical component force (reaction force) of a force from above at a time of clamping.

That is, when the upper portion (clamped portion) 11k of the housing 11 in FIG. 4B is bent in the direction of an arrow Y1 to the position shown by the two-dot chain line for clamping, a force P from above during the clamping is a component force (vertical force) in the peripheral direction of the ball seat 12. More in detail, as shown in FIG. 6, when a force P from above during clamping acts, a vertical component force F (component force F of the force P from above) acts to press the the ball seat 12 on the inner face of the housing 11. Note that the vertical component force F is denoted as a reaction force F of the vertical component force F. Further, the vertical component force F is expressed by $[F=P/\cos \theta]$.

Figure 7:
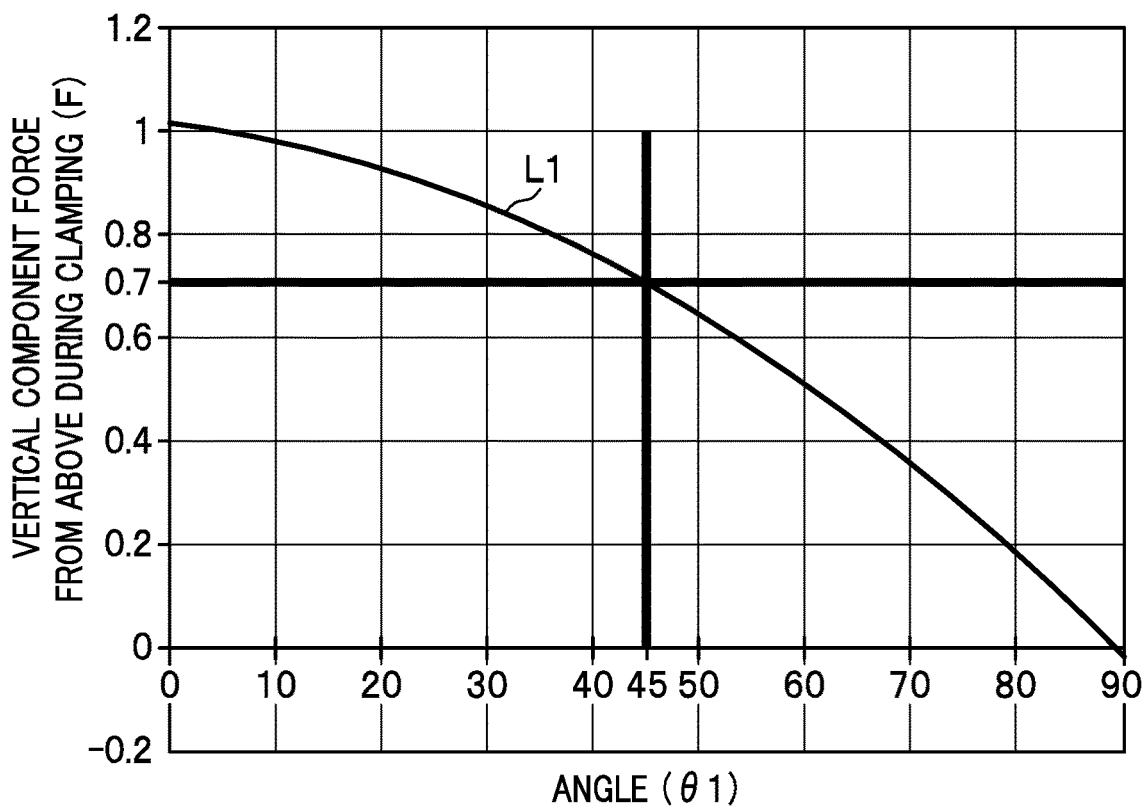
FIG. 7 is a graph showing a relationship between the vertical component force of the force from above at the time of clamping and positions at an end of the lower opening of the ball seat.

As shown by a curve L1 in FIG. 7, the vertical component force F has the maximum value "1" at the position of $[\theta 1=0°]$, the value decreases toward the bottom of the ball seat 12 (see FIG. 5B) toward which the angle $\theta 1$ increases, and the value has the minimum value "0" at the position of $[\theta 1=90°]$. At the lower opening end position of $[\theta 1=45°]$, the vertical component force F is 70% of the maximum value "1". This indicates that the force P from above effectively acts until the lower opening end position at around 45°. Therefore, when the reduction rate of the vertical component force F is assumed to be 70%, 45° is a limit for the angle $\theta 1$. However, since there is an error and if the error is assumed to be 5%, the reduction rate is 65% taking into account the 5% error with respect to 70%, which results in $\theta 1=49°$. Thus, the lower opening end position is in the range satisfying $[45° \leq \theta 1 \leq 49°]$.

However, from a viewpoint of anti-abrasion, a contact area between the ball seat 12 and the ball portion 10b is advantageously large. If the angle $\theta 1$ is smaller than 45°, abrasion resistance is poor. Though the lower limit of the angle $\theta 1$ is set to be 45°, if an error 4° is assumed, the angle $\theta 1$ is set in the range satisfying $[41° \leq \theta 1 \leq 49°]$.

Further, as shown in FIG. 4A, though the thickness between the inner and outer faces of the ball seat 12 is basically constant, the thickness of the ball seat 12 at the lower part below the reference line H1 is preferably between 0.4 mm and 2.0 mm. If a grease groove 12B1 (see FIG. 10A) is not formed as described later in the housing 11 of the ball seat 12, the thickness of the part below the reference line H1 may be 0.4 mm. However, since the ball seat 12 is tubular, the ball portion 10b is fitted in a state that the ball seat 12 becomes thinner downward and extends to a given position when the ball portion 10b is inserted and pushed into the housing 11.

The outer diameter of the ball seat 12 needed, in the conventional configuration described above, 0.07 mm to 0.1 mm as a tolerance range, assuming that the outer diameter is, for example, ∅ 20. Further, assuming that the inner diameter of the housing 11 and the outer diameter of the ball seat 12 are ∅ 20, a dimensional tolerance due to a variation in molding shrinkage and processing and a variation caused by heat shrinkage when the ball seat 12 is removed from a mold is [7/100=0.07 mm] as a tolerance range.

Therefore, in the present embodiment, as shown in FIG. 4B, the ball joint 1b has a basic configuration in which the ball seat 12 having a thickness, with which a reaction force is generated when the ball seat 12 is pressed from above with the clamped portion 11k, supports the ball portion 10b. In this case, if the thickness of the ball seat 12 is, for example, 1 mm to 2 mm, a dimensional tolerance may be ¹⁄₂₀ of 0.07 mm. In this case, the dimensional tolerance is $[0.07 \times (1/20) =0.0035$ mm]. In other words, the ball joint 1b is obtained in which the ball portion 10b is accommodated via the ball seat 12 in the housing 11, with the accuracy of this dimension tolerance.

Thus, in the present embodiment, the dimension of the ball joint 1b is controlled with the thickness of the ball seat 12 having a minimal dimensional tolerance, instead of the accumulation of the diameter dimensions of components (dimensional tolerance is large) as described above with the conventional technique. Therefore, the ball seat 12 of the present embodiment is molded having the above thickness between 0.4 mm and 2.0 mm, with at least 0.01 mm tolerance range or less.

Since the conventional configuration does not obtain a pressure by clamping the ball ball seat 12 as the present embodiment, if, dimensional tolerance of the housing 11 having an inner diameter ∅ 20 and of the ball seat 12 having an outer diameter ∅ 20 are 0.07 mm, the variation in dimension of [0.07+0.07=0.14 mm] was inevitable. In this case, if the ball portion 10b is fitted loosely, a tightening margin becomes too small and cannot be changed larger, so that the tightening margin had to be large, in other words, tight.

However, as in the present embodiment, if the thickness of the ball seat 12 is based, the above dimensional variation of 0.14 mm is absorbed, and a minimal dimensional variation can be [0.07+0.01=0.08 mm] as described above. Therefore, since the dimensional variation is very small when the ball seat 12 is fitted into the housing 11 for assembly, the property at the time of swinging and sliding is controlled. Note that, the ball joint 1b may have a second structure having an annular member in an O-ring shape arranged between the ball seat 12 and the clamped portion 11k to press the ball seat 12, instead of a first structure having the clamped portion 11k to directly press the ball seat 12. Both of the clamped portion 11k and the annular member in the second structure, the clamped portion 11k in the first structure and the like constitute a pressure regulating member in the appended claims.

As shown in FIG. 5B, when the ball portion 10b is accommodated, the inner face of the ball seat 12 is in a spherical shape along the outer periphery of the ball portion 10b, and the ball seat 12 delimits a space (spherical space) 12k in a substantially spherical shape with the upper and lower ends being cut at the upper and lower opening end positions in parallel with the reference line H1. Therefore, the ball portion 10b is accommodated in the spherical space 12k swingably and rotatably and moves with the stud portion 10s (see FIG. 4A) integrated therewith. In this case, the stud portion 10s receives a swing-and-slide torque caused by the r swinging and rotating of the ball portion 10b in the spherical space 12k.

As shown in FIG. 4A, the housing 11 is made of steel such as carbon steel for machine structure, is in a cup shape, and has the inner face (spherical inner face) 11a in which the ball portion 10b can be accommodated via the ball seat 12. Note that the spherical inner face 11a is formed such that the spherical upper end is cut in parallel with the reference line H1. The ball seat 12 is arranged on the spherical inner surface 11a without any gap. Further, the grease chamber 11g is delimited below the ball portion 10b in the spherical inner face 11a, when the ball portion 10b is accommodated via the ball seat 12. The grease chamber 11g is delimited by the ball portion 10b having a flat bottom.

The ball portion 10b is accommodated in the spherical inner face 11a of the housing 11 via the tubular ball seat 12, to support the stud portion 10s of the ball stud 10 swingably and rotatably. A joining end between the stud portion 10s and the ball portion 10b is prevented from being positioned in the spherical inner face 11a.

Thus, the ball joint 1b is configured to have a ball joint structure such that the ball portion 10b formed in one piece with the stud portion 10s of the ball stud 10 is accommodated in the spherical inner face 11a of the housing 11 swingably and rotatably via the ball seat 12. In this configuration, when the stud portion 10s swings, the ball portion 10b receives a swing torque, and when the stud portion 10s rotates, the ball portion 10b receives a rotation torque. The swing torque and rotation torque are one mode of the swing-and-slide torque.

Advantageous Effects of Embodiment (1) According to the feature of the present embodiment, the ball joint 1b includes the ball seat 12 that is an elastic body having a given thickness in a tubular shape with the upper and lower thereof being open, and is formed to have the spherical space 12k to allow the stud portion 10s to protrude through the opening (upper opening 12op) and to accommodate the ball portion 10b. Further, the housing 11 has the spherical inner face 11a along the outer periphery of the ball portion 10b, and the ball seat 12 is accommodated to fill the gap between the outer periphery of the ball seat 12 inserted toward the spherical inner face 11a and the spherical inner face 11a.

According to the configuration, the elastic ball seat 12 intervenes in the spherical face between the spherical inner face 11a of the housing 11 and the outer periphery of the ball portion 10b. Therefore, the ball seat 12 receives the substantially even pressure and the elastic force of the ball seat 12 acts to repel the pressure. Accordingly, the property when the ball portion 10b of the ball stud 10 swings and slides in the housing 11 can be properly controlled by the elastic force of the ball seat 12.

(2) The housing 11 has the clamped portion 11k as pressure regulating member at the peripheral end of the housing 11, and the clamped portion 11k is clamped to press the ball seat 12 such that the ball portion 10b accommodated in the spherical inner face 11a of the housing 11 via the ball seat 12 is swingable and rotatable.

According to the configuration, the clamped ball seat 12 having the thickness with the small dimensional tolerance can support the ball portion 10b. That is, the ball portion 10b of the ball stud 10 is inserted in the spherical inner face 11a of the housing 11 via the ball seat 12, and clamped portion 11k is clamped to press the ball portion 10b on the spherical inner face 11a. With the pressing force, the ball seat 12 is elastically deformed in the radial direction of the ball portion 10b. The ball seat 12 bulges in the radial direction of the ball portion 10b by the elastic deformation force to tighten the ball portion 10b by the given tightening margin.

Therefore, the ball portion 10b is compressed by the bulge according to the elastic deformation force of the ball seat 12 due to clamping, and the tightening margin of the ball portion 10b is controlled, to obtain the reaction force for the given torque. The reaction force for the given torque is a reaction force to realize the swing-and-slide torque with which elastic lift is prevented from increasing and the ball portion 10b is prevented from clattering. Accordingly, the swing-and-slide torque is reduced and the elastic lift is prevented from increasing so that the clattering is prevented, resulting in improving riding comfort of the vehicle.

(3) The clamping by the clamped portion 11k is made in which the tightening margin between the housing 11 and the ball seat 12 of the clamping is set such that the swing-and-slide torque of the ball stud 10 is 0.5 Nm or less.

Thus, the tightening margin due to the clamping by the clamped portion 11k is set such that swing-and-slide torque caused by the steady swing torque and steady rotation torque is 0.5 Nm or less. With the lower torque, riding comfort (especially, in a fine amplitude region) is improved.

(4) The ball seat 12 may be in a tubular shape having the upper opening 12op as a first opening through which the stud portion 10s can protrude and the lower opening 12od as a second opening that opens on the opposite side of the upper opening 12op.

According to the configuration, since the ball seat 12 is in a tubular shape with the top and bottom being open, the ball portion 10b accommodated in the spherical inner face 11a of the housing 11 via the ball seat 12 can be easily swung and rotated.

(5) The opening diameter D1 of the upper opening 12op of the ball seat 12 is set to [90%±5%] of the spherical diameter D2 passing through the center of the ball portion 10b.

Accordingly, the upper opening 12op of the ball seat 12 can be dimensioned to secure the swing angle of the stud portion 10s. The lower opening 12od can be dimensioned to support the fall-off load so that the ball portion 10b is prevented from falling off from the ball seat 12.

(6) The end of the lower opening 12od of the ball seat 12 is set to the position, where the ball seat 12 intersects with the straight line G1 that forms the angle θ1 at the center P1 with the reference line H1 passing through the center P1 of the ball portion 10b. The angle θ1 is set in the range satisfying [41°≤θ1≤49°].

Accordingly, the force toward the lower end of the spherical inner face 11a of the housing 11 at the time of clamping can effectively act up to the end position of the lower opening 12od of the ball seat 12. In this case, the abrasion resistance between the ball seat 12 and ball portion 10b can be also improved.

(7) The thickness of the ball seat 12 from the reference line H1 to the lower end of the housing 11 is set between 0.4 mm and 2.0 mm.

Accordingly, the following advantageous effects can be obtained. Since the ball portion 10b is supported with the elastic force of the ball seat 12 surrounding the ball portion 10b, the dimensional tolerance of only the thickness of the ball portion 10b has to be considered. Therefore, if compared with the conventional case in which the accumulation at the time of assembling the respective components such as the housing 11 and the ball seat 12 is regarded as the dimensional tolerance, the present embodiment has the dimensional tolerance being significantly smaller because only the thickness of the ball portion 10b has to be considered. With the significantly smaller dimensional tolerance, the ball portion 10b is accommodated in the housing 11 via the ball seat 12, to form the ball joint 1b. Accordingly, since tightening margin of the ball portion 10b by clamping is adjustable accurately, the reaction force for the given torque is easily obtained.

First Modification of Embodiment

Figure 8:
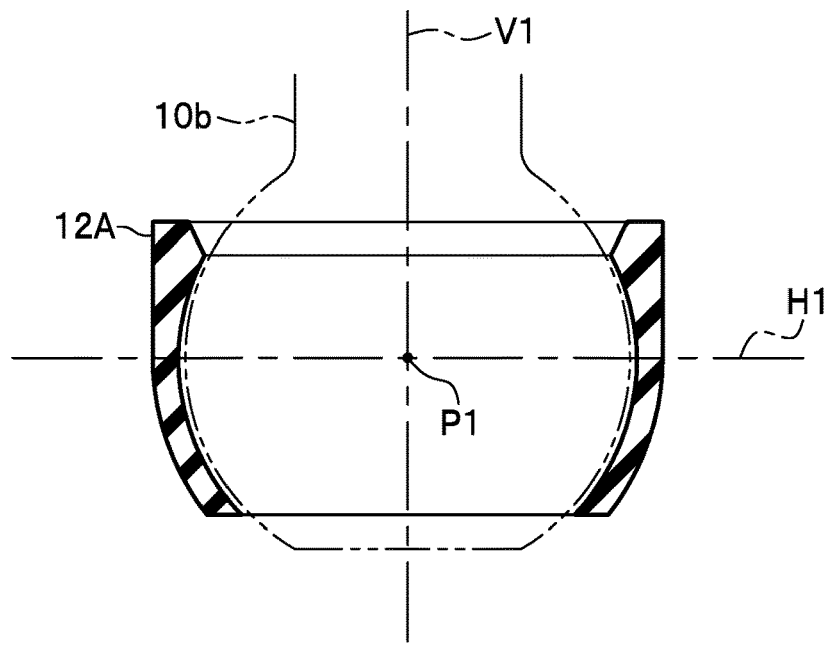
FIG. 8 is a longitudinal cross-sectional view of a ball seat according to a first modification of the present embodiment.

FIG. 8 is a longitudinal cross-sectional view of a ball seat 12A according to a first modification of the present embodiment. Part of the ball seat 12A below the reference line H1 has a thickness tapered to be gradually thinner toward its lower end.

Figure 9:
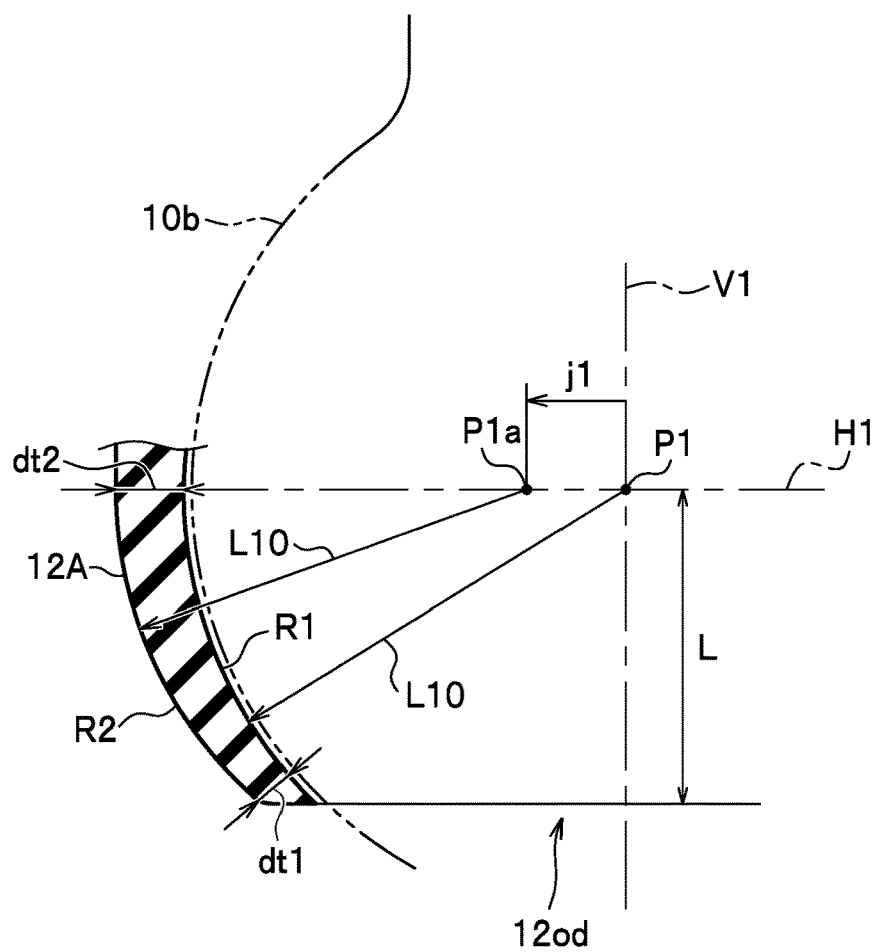
FIG. 9 is a longitudinal cross-sectional view of a ball seat 12A in the lower left region defined by a reference line H1 and a vertical axis V1 in FIG. 8 that intersect with each other.

The tapered shape will be described in detail with reference to FIG. 9. FIG. 9 is a longitudinal cross-sectional view of the ball seat 12A in the lower left region defined by the reference line H1 and the vertical axis V1 in FIG. 8 that intersect with each other. The tapered shape of the ball seat 12A in FIG. 9 is defined by a circular arc R1 having a straight line L10 with a given length from the center P1 of the ball portion 10b as a radius, and a circular arc R2 having the straight line L10 as a radius from a point Pia horizontally shifted by a given length j1 with respect to the center P1 in the radius direction of the ball portion 10b.

The end in a taper shape of the lower opening 12od between the circular arcs R1 and R2 is formed, as described with reference to FIG. 5B, by cutting the ball seat 12A at the intersection between the straight line G1 that forms the angle θ1 with the reference line H1 and the ball seat 12A. At this time, a thickness dt1 (lower end thickness) at the end of the lower opening 12od of the ball seat 12A is preferably set to be 0.4 mm or more. This is a value in consideration of fluidity of the molten resin at the time of injection molding the ball seat 12A.

A thickness dt2 (reference thickness) at a position where the ball seat 12A intersects with the reference line H1 thereof is thickest in the taper shape. The lower end thickness dt1 is thinner than the reference thickness dt2.

With the tapered shape, as described with reference to FIG. 6, the force P from above at the time of clamping is used as component force R in the peripheral direction of the ball seat 12A, to generate by the wedge effect the ball holding force R for holding the ball portion 10b.

The ball holding force R is represented by [R=P/sin θ2].

Assuming that the thickness dt1 of the lower end in a taper shape of the ball seat 12A in FIG. 9 is set to be 0.4 mm, since a difference dt between the reference thickness dt2 (e.g. 2 mm) and the lower end thickness dt1=0.4 mm is expressed by, as shown in FIG. 6, [tan θ2=dt/L], a taper angle is set in the range satisfying [2°≤θ2≤14.5°].

Note that the L is a developed length from the reference line H1 to the lower end.

With the use of the ball seat 12A, the ball portion 10b can be held, by the wedge effect, by the component force R in the peripheral direction of the ball seat 12A of the force P from above at the time of clamping.

Second Modification of Embodiment

Figure 10A:
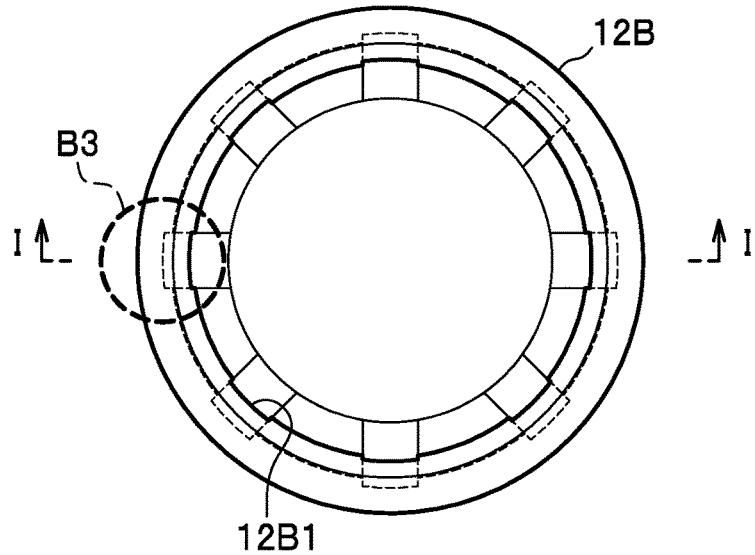
FIG. 10A is a plan view of a ball seat 12B according to a second modification of the present embodiment.
Figure 10B:
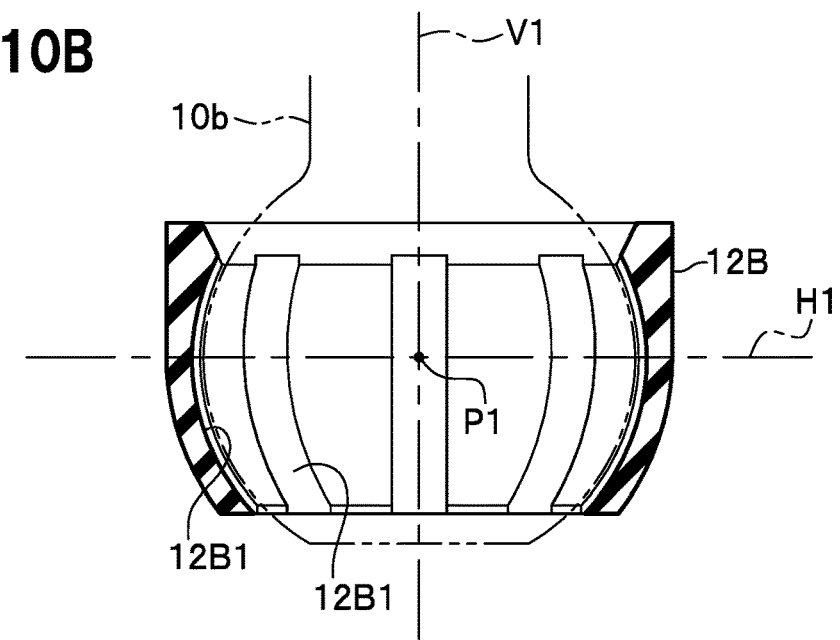
FIG. 10B is a cross-sectional view taken along a line I-I in FIG. 10A.
Figure 10C:
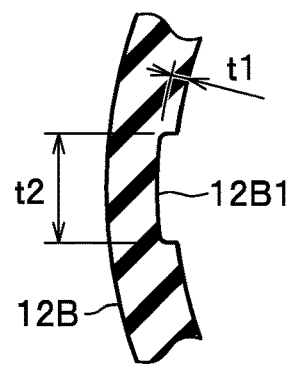
FIG. 10C is an enlarged view of those within a circle B3 in FIG. 10A.

FIG. 10A is a plan view of a ball seat 12B according to a second modification of the present embodiment, FIG. 10B is a cross-sectional view taken along a line I-I in FIG. 10A, and FIG. 10C is an enlarged view of those within a circle B3 shown by a dashed line in FIG. 10A.

The ball seat 12B is formed with grease grooves 12B1 as lubricant grooves in the inner face of the above-mentioned tapered ball seat 12, which faces the ball portion 10b. As shown in FIG. 10A, eight grease grooves 12B1 are formed at equal intervals in the ball seat 12B of the second modification. As shown in FIG. 10B, the grease grooves 12B1 are formed along the vertical axis V1 from the upper end to the lower end of the ball seat 12B. Note that the grease groove 12B1 corresponds to a groove in the appended claims.

As shown in FIG. 10C, a depth t1 (groove depth) of the grease groove 12B1 is set in a dimensional range between 0.1 mm and 0.5 mm, and a width t2 is set to 2.0 mm, for example.

Figure 11:
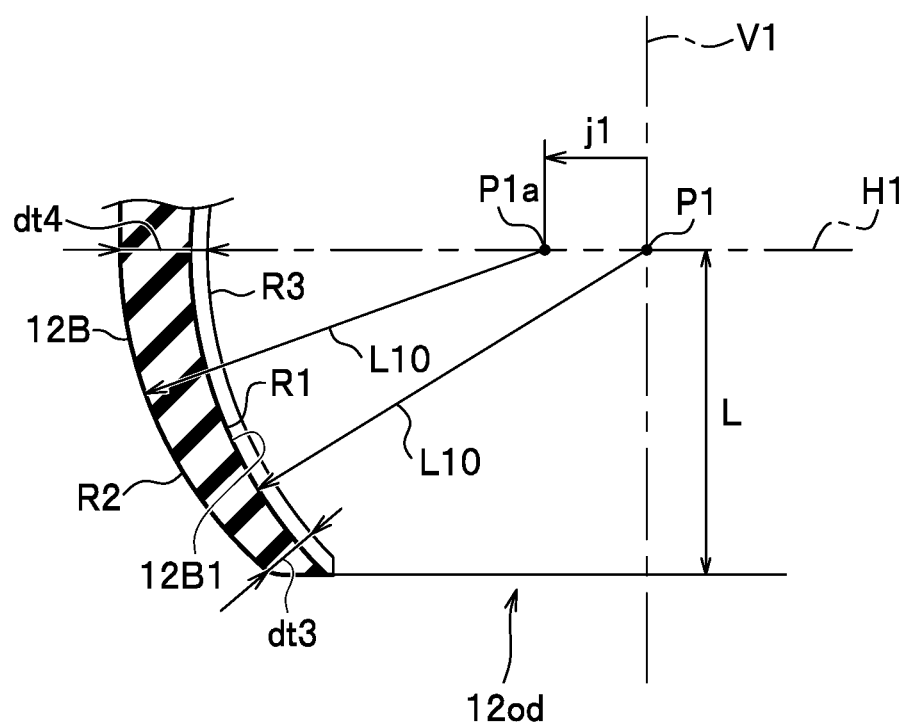
FIG. 11 is a longitudinal cross-sectional view of the ball seat in the lower left region defined by the reference line H1 and the vertical axis V1 in FIG. 10B that intersect with each other.

FIG. 11 is a longitudinal cross-sectional view of the ball seat 12B in the lower left region defined by the reference line H1 and the vertical axis V1 in FIG. 10B that intersect with each other. The ball seat 12B in a taper shape in FIG. 11 has the same thickness as the ball seat 12A described above, but the inner face of the ball seat 12B includes a bottom face of the grease groove 12B1 as the circular arc R1 described above and a circular arc R3 that is the circular arc R1 widened by the groove depth t1.

The end in a taper shape of the lower opening 12od between the circular arcs R3 and R2 is formed, as described with reference to FIG. 5B, by cutting the ball seat 12B at the intersection between the straight line G1 that forms the angle θ1 with the reference line H1 and the circular arc R3 of the ball seat 12B. At this time, a thickness dt3 (lower end thickness) at the end of the lower opening 12od of the ball seat 12B in FIG. 11 is preferably set to be 0.4 mm or more. This is a value in consideration of fluidity of the molten resin at the time of injection molding the ball seat 12B, and the grease grooves 12B1 are also simultaneously molded by the injection molding. Further, the grease grooves 12B1 may also be formed in the ball seat 12 having a constant thickness described above.

Further, a thickness dt4 (reference thickness) between the circular arcs R2 and R3 at a position where the ball seat 12B intersects with the reference line H1 thereof is thickest in the taper shape.

With the tapered shape, as with the ball seat 12A described above, the force P (see FIG. 6) from above at the time of clamping is converted to the component force R in the peripheral direction of the ball seat 12B, to generated by wedge effect the ball holding force R for holding the ball portion 10b. Further, as described above, assuming that the lower end thickness dt3 at the lower end in a taper shape of the ball seat 12B is set to be 0.5 mm, the taper angle is in the range satisfying [2°≤θ2 (see FIG. 6)≤9°].

With the use of the ball seat 12B, the ball portion 10b can be held, by wedge effect, by the component force R in the peripheral direction of the ball seat 12B of the force P from above at the time of clamping. In this case, since lubricating oil flows in the grease grooves 12B1, the ball portion 10b can be swung and rotated smoothly.

Further, since the ball seat 12B is simultaneously molded by injection molding, including the grease grooves 12B1, the ball seat 12B can be efficiently produced.

Third Modification of Embodiment

Figure 12:
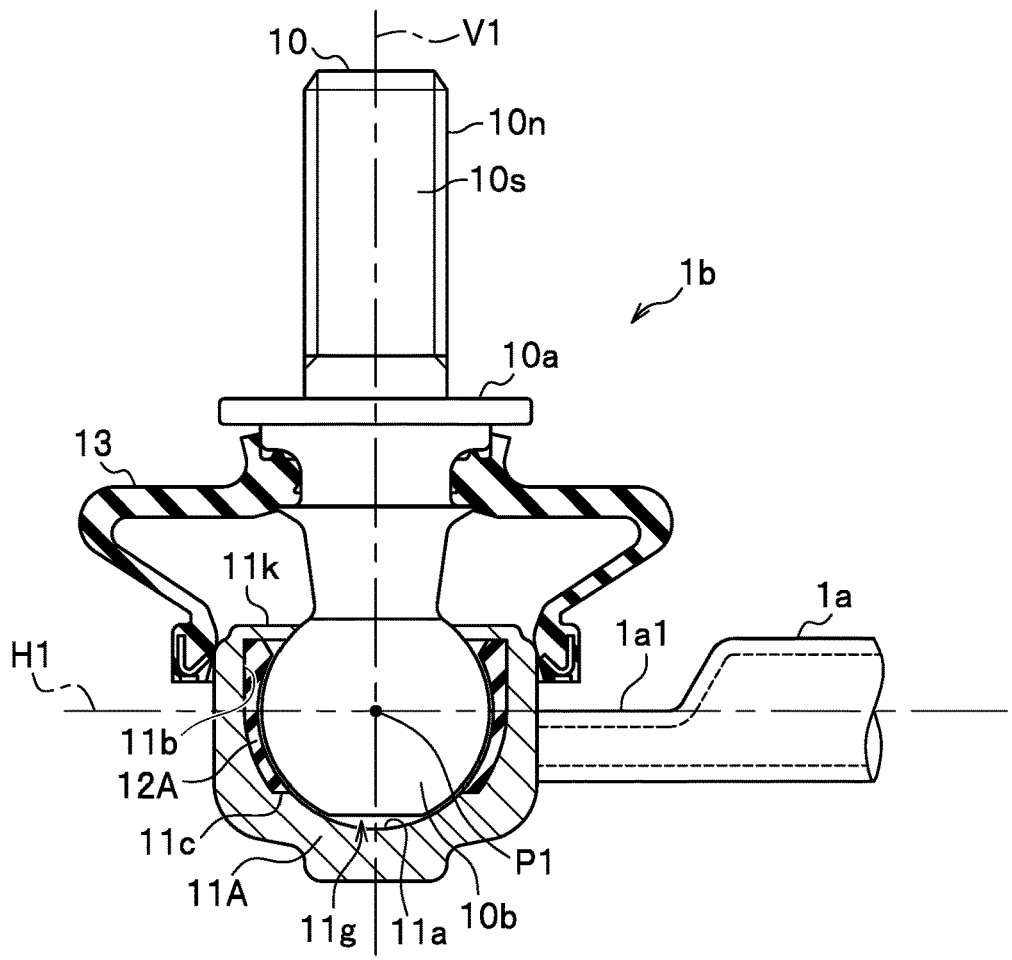
FIG. 12 is a longitudinal cross-sectional view of a ball joint with a housing according to a third modification of the present embodiment.

FIG. 12 is a longitudinal cross-sectional view of the ball joint 1b with a housing 11A according to a third modification of the present embodiment.

The housing 11A includes a ball seat fitting recess 11b (also referred to as a recess) surrounding, in a concave groove shape, the side portion of the spherical inner face 11a. The recess 11b includes a support portion 11c at its lower end, to fit the ball seat 12A described above in the concave groove that is formed in a concave groove shape.

When the ball seat 12A is fitted, firstly, the ball portion 10b of the ball stud 10 is inserted in the spherical space of the ball seat 12A for assembly. Then, the assembled ball portion 10b and the ball seat 12A is inserted and set in the recess 11b of the housing 11A. This setting causes the lower end of the ball seat 12A to be arranged at the support portion 11c, and the upper face protrudes to be exposed above the spherical inner face 11a. Then, the clamped portion 11k is clamped.

The ball seat 12A is pressed against the support portion 11c by the force from above at the time of clamping. With the pressing force, the ball seat 12A elastically deforms to bulge in the thickness direction. With the bulge, the clamping force (tightening margin) of the ball portion 10b in the ball seat 12A is controlled.

Figure 13:
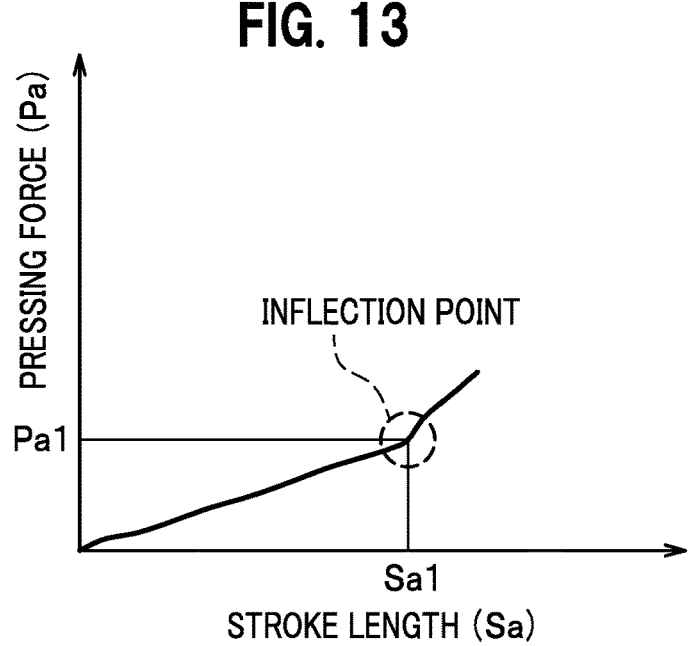
FIG. 13 is a graph showing a position of an inflection point of the clamped portion with respect to a pressing load at the time of clamping and a stroke length of the clamped portion.

Accordingly, the clamping is stopped at the optimal clamping position, while a pressing load Pa during the pressing from above as indicated by a vertical axis in FIG. 13 and a stroke length Sa indicated by a horizontal axis during the clamped portion 11k being clamped downward are measured. The optimal clamped position is at an inflection point of the clamped portion 11k where the pressing load is Pa1 and the stroke length is Sa1. At this position, the swing-and-slide torque is optimally reduced and the tightening margin is easily determined. In other words, the tightening margin at the optimal clamping position reduces the swing-and-slide torque and suppresses an increase of elastic lift to prevent clattering such that riding comfort of the vehicle is improved. Note that, instead of the ball seat 12A, the ball seat 12 or the ball seat 12B may be inserted in the recess 11b to obtain similar advantageous effects.

Fourth Modification of Embodiment

Figure 14:
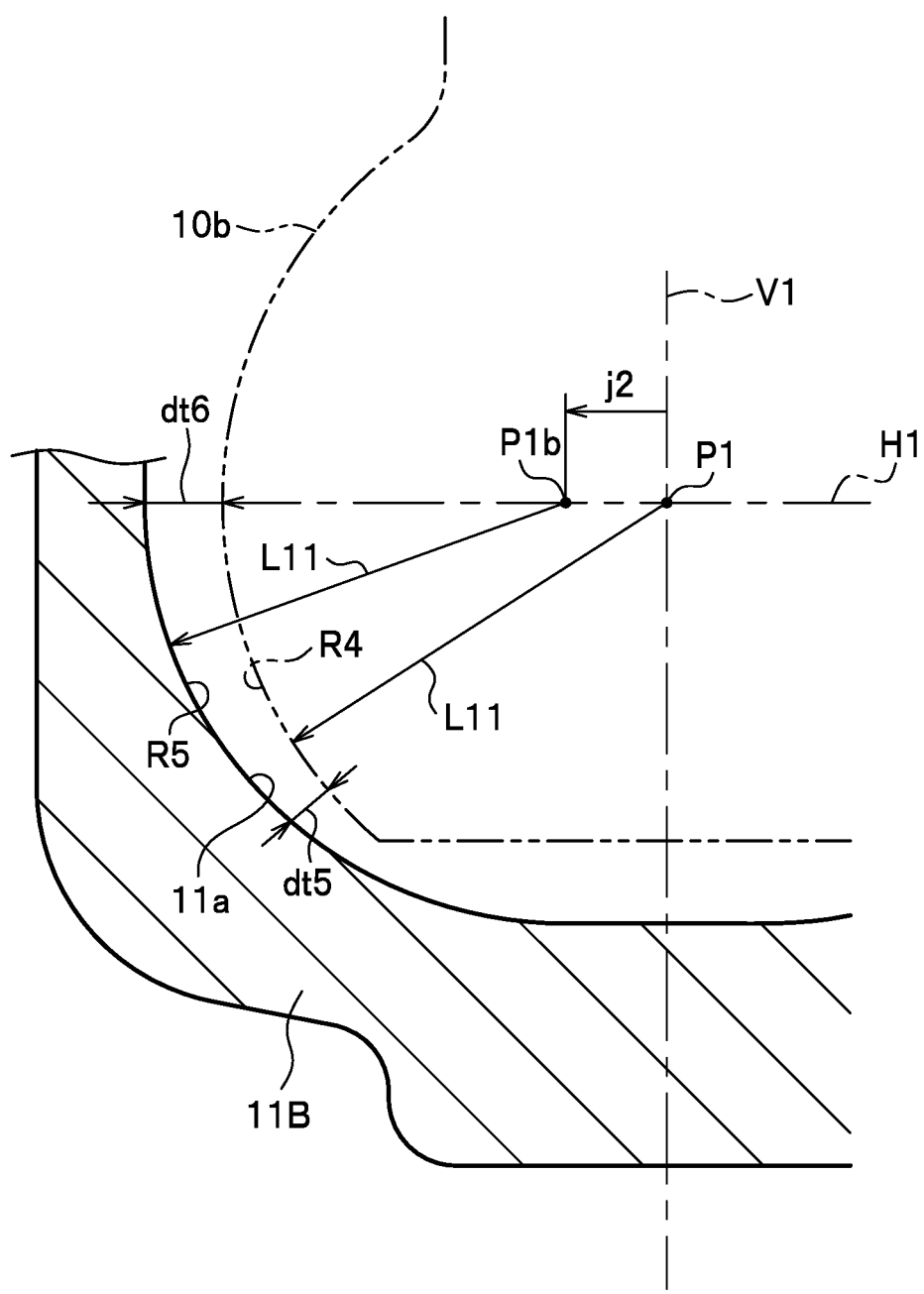
FIG. 14 is a partial cross-sectional view of a configuration having a gap in a taper shape between the housing and the ball portion according to a fourth modification of the present embodiment.

FIG. 14 is a partially cross-sectional view of a configuration having a gap in a taper shape between the housing 11B and the ball portion 10b according to a fourth modification of the present embodiment.

As shown in FIG. 14, the fourth modification has a feature in which the cross-sectional shape of the gap between the spherical inner face 11a of the housing 11 and the outer periphery of the ball portion 10b is made in a taper shape below the reference line H1.

The tapered shape will be described. A circular arc R4 of the outer periphery of the ball portion 10b has a straight line L11 with a given length from the center P1 as a radius. A circular arc R5 has the straight line L11 as a radius from a point P1b horizontally shifted by a given length j2 with respect to the center P1 in the radius direction of the ball portion 10b. The spherical inner face 11a is formed by the circular arc R5 below the reference line H1 of the housing 11B.

With these, the gap below the reference line H1 between the spherical inner face 11a of the housing 11 and the outer periphery of the ball portion 10b is tapered. A dimension dt5 at the lower end of the gap in a taper shape is smaller than a dimension dt6 at a position of intersection with the reference line H1. When the ball seat 12 described above is inserted in the gap in a taper shape, the ball seat 12 is more constantly pressed by the spherical inner face 11a (R5) of the housing 11 and the outer periphery (R4) of the ball portion 10b. The same design can be applied to other ball seats, that is, the ball seats 12A and 12B.

Therefore, the ball holding force R for holding the ball portion 10b via the ball seat 12 is improved, and the tightening margin is more easily controlled. Therefore, swing-and-slide torque is reduced and elastic lift is suppressed from increasing to prevent clattering, resulting in improving riding comfort of the vehicle.

Specific configurations may be appropriately modified within a scope not departing from the spirit of the present invention. The ball joint of the present invention is applicable to joints of a robot arm such as of an industrial robot and humanoid robot, and to a device having arms rotated at joints such as an excavator and a crane.

REFERENCE OF NUMERALS

1: stabilizer link 1a: support bar (rod member) 1b: ball joint (connecting portion) 2: stabilizer (first structure body) 2b: arm portion 3: suspension device (second structure body) 3b: damper 10: ball stud 10b: ball portion (spherical body portion) 10s: stud portion 11, 11A, 11B: housing 11a: spherical inner face 11g: grease chamber 11k: clamped portion 12, 12A, 12B: ball seat (support member) 12k: spherical space 12op: upper opening (first opening) 12od: lower opening (second opening) 12B1: grease groove (groove) 13: dust cover

What is claimed is:

1. A ball joint comprising:
a ball stud that has a stud portion with one end being coupled to a structure body and the other end being joined in one piece with a spherical body portion;
a housing that includes a space in which the spherical body portion of the ball stud is supported swingably and rotatably; and
a support member that is arranged between the housing and the spherical body portion,
wherein the support member is an elastic body having a given thickness, and has a first opening for the stud portion to protrude therethrough and a spherical space inside to accommodate the spherical body portion therein,
wherein a thickness of the support member at a lower portion closer to an opening at a lower side is in a tapered shape that is gradually thinner toward the opening at the lower side from a portion of the support member at a level of a center position of the spherical body portion that is accommodated in a spherical space of the support member, and
wherein the housing has a spherical inner face along an outer periphery of the spherical body portion, and the support member that is displaceably pressed by a pressure regulating member is arranged between the outer periphery of the spherical body portion that is inserted toward the spherical inner face.

2. The ball joint according to claim 1,
wherein the housing has a clamped portion as the pressure regulating member at a peripheral end of the housing, and
wherein the clamped portion has a shape to be clamped so as to press the support member so that the ball portion accommodated in the spherical inner face of the housing via the support member is swingable and rotatable.

3. The ball joint according to claim 2,
wherein clamping with the clamped portion is made to set a tightening margin between the housing and the support member by the clamping such that a swing-and-slide torque of the ball stud is 0.5 Nm or less.

4. The ball joint according to claim 1,
wherein the support member is in a tubular shape that includes a second opening that opens on an opposite side of the first opening.

5. The ball joint according to claim 4,
wherein a diameter of the first opening of the support member is [90%±5%] of a spherical diameter passing through a center of the ball portion.

6. The ball joint according to claim 4,
wherein an end of the second opening of the support member is set to a position, where the support member intersects with a straight line that forms an angle $\theta 1$ at a center of the ball portion with a reference line passing through the center, and the angle $\theta 1$ is set in a range satisfying [41°≤$\theta 1$≤49°].

7. The ball joint according to claim 6,
wherein a thickness of the support member from the reference line to a lower end of the housing is set between 0.4 mm and 2.0 mm.

8. The ball joint according to claim 4 further comprising at least one groove that is formed in a concave shape having a given width from the first opening toward the second opening in an inner face of the spherical space of the support member,
wherein a depth of the groove is set in a dimensional range between 0.1 mm and 0.5 mm.

9. The ball joint according to claim 4,
wherein the housing includes a recess circumferentially formed in a concave groove shape between the first opening and the second opening in the spherical inner face, and
wherein a support portion is formed in the recess to receive a lower end of the support member when the clamped portion is clamped, after the support member is arranged in the recess.

10. The ball joint according to claim 4,
wherein a spherical inner face of the housing is formed such that a cross-sectional shape of a gap between the spherical inner face of the housing and an outer periphery of the spherical body portion is in a taper shape from a level of a center position of the spherical body portion toward the second opening.

11. The ball joint according to claim 1,
wherein a taper angle $\theta 2$ of the lower portion in a taper shape of the support member is in a range satisfying [2°≤$\theta 2$≤14.5°].

12. The ball joint according to claim 1,
wherein a thickness at the lower portion in a taper shape of the support member is set to be 0.4 mm or more.

* * * * *